United States Patent [19]
Spector

[11] Patent Number: 6,015,160
[45] Date of Patent: Jan. 18, 2000

[54] COMBINED SAFETY HELMET AND PA SYSTEM

[76] Inventor: Donald Spector, 380 Mountain Rd., Union City, N.J. 07080

[21] Appl. No.: 09/067,266

[22] Filed: Apr. 27, 1998

Related U.S. Application Data

[63] Continuation-in-part of application No. 08/958,339, Oct. 27, 1997, which is a continuation-in-part of application No. 08/827,949, May 2, 1997, Pat. No. 5,842,714.

[51] Int. Cl.[7] .................................................... B64H 1/00
[52] U.S. Cl. ........................................... 280/288.4; 381/75
[58] Field of Search ............................... 280/288.4; 2/410, 2/422, 425, 905, 906; 381/82–86, 88, 75, 77

[56] References Cited

U.S. PATENT DOCUMENTS

| | | | |
|---|---|---|---|
| 3,890,475 | 6/1975 | Denhart | 179/156 A |
| 4,400,591 | 8/1983 | Jennings | 179/156 A |
| 5,243,659 | 9/1993 | Stafford | 381/86 |

*Primary Examiner*—Christopher P. Schwartz
*Assistant Examiner*—L. T. Bartz
*Attorney, Agent, or Firm*—Michael Ebert

[57] ABSTRACT

A safety helmet for a bicyclist combined with a miniature public address (PA) system which makes it possible for the riding bicyclist to broadcast to those who are in the hearing range of the system. The helmet which is formed from an outer shell having a cushioning inner liner has extending therefrom a gooseneck supporting a microphone at a position adjacent the mouth of the bicyclist wearing the helmet. The microphone is connected by a line passing through the gooseneck and extending behind the helmet to a compact amplifier and loud speaker unit clipped onto the waist belt of the bicyclist. Power for the unit is supplied by a battery power back, included in the unit or incorporated in the frame of the bicycle.

8 Claims, 1 Drawing Sheet

COMBINED SAFETY HELMET AND PA SYSTEM

RELATED APPLICATIONS

This application is a continuation-in-part of my copending application, Ser. No. 08/958,339, filed Oct. 27, 1997, entitled "Interactive Safety Helmet For Bicyclist", which in turn is a C-I-P of the application Ser. No. 08/827,949, filed May 2, 1997 now U.S. Pat. No. 5,842,714 granted Dec. 1, 1998, entitled "Bicycle Power Pack".

BACKGROUND OF INVENTION

1. Field of Invention

This invention relates generally to safety helmets for bicyclists, and more particularly to a safety helmet combined with a miniature public address (PA) system making it possible for riding bicyclists to broadcast to those in the hearing range of the system.

2. Status of Prior Art

The above-identified copending patent application, Ser. No. 08/827,949 discloses a bicycle having incorporated in its frame a battery power pack for supplying operating power to bicycle accessories, such as head and tail lights. The bicycle power pack is also capable of supplying power to a safety helmet worn by a bicyclist, the helmet being equipped with a radio and safety lights.

In my above-identified copending application Ser. No. 08/958,339, there is disclosed an interactive safety helmet for a bicyclist, making it possible for a group of bicyclists wearing like helmets to communicate with each other and thereby coordinate their activities. The helmet is formed by an outer shell shaped to fit onto the head of the bicyclists and an inner cushioning liner having a pair of miniature loud speakers embedded therein at opposing sides adjacent the ears of the bicyclist. Extending from the shell is a gooseneck supporting a microphone at a position adjacent the mouth of the bicyclist.

Mounted on the shell is a miniature radio transceiver whose transmitter section is coupled to the microphone and whose receiver section is coupled to the loud speakers; the transceiver being connected by a line extending from the helmet to an external battery power pack, such as a power pack incorporated in the frame of the bicycle. In operation, each bicyclist wearing the helmet can, by talking into the microphone and listening to the loud speakers, interact with other bicyclists in the group. The helmet is also provided on either side thereof with an LED flashing safety light powered by the same power pack.

Though a safety helmet provided with a transceiver makes it possible for a bicyclist to communicate with similarly equipped bicyclists, the bicyclist wearing this helmet lacks the ability to broadcast directly to pedestrians, to fellow bicyclists who are not provided with a transceiver, and other nearby individuals.

For example, should the bicyclist wearing the helmet wish to inform a fellow bicyclist riding on an adjacent bicycle that he intends to veer off the road, he can only be heard by the fellow bicyclist if he shouts this message. But even this he may not be heard, particularly if the road is heavily travelled and noisy. Or the bicyclist seeing that he is approaching a pedestrian on the road may wish to warn the pedestrian to get out of the way, yet the pedestrian is unable to hear the bicyclist.

Since the invention combines a safety helmet with a miniature public address PA system which functions somewhat in the manner of a bullhorn. A conventional PA system installed in a public area consists of a microphone coupled to the input of an amplifier whose output is applied to a loud speaker. If an a-c power outlet is not available in the public area, then a battery power pack must be provided to power the amplifier.

A bullhorn is effectively a self-contained miniature PA system in which the microphone is placed at the mouth piece of a horn having an amplifier, a loud speaker and a battery power pack installed therein, the horn acting to acoustically amplify the output of the loud speaker.

While a bicyclist wearing a helmet could use a bullhorn to broadcast messages to those in the hearing range of this horn, its use by a riding bicyclist is impractical. There is no place on a bicycle to put a horn when it is not in use, and when the horn is in use, it must be grasped by at least one hand of the bicyclist who normally requires both hands to hold the handlebars of the bicycle.

SUMMARY OF INVENTION

In view of the foregoing, the main object of this invention is to provide a safety helmet, for a bicyclist which is combined with a miniature public address system making it possible for the riding bicyclist wearing the helmet to broadcast messages to those who are in the hearing range of the PA system.

A significant advantage of the invention is that only the microphone of the PA system is attached to the safety helmet, all other components of the system including the power supply being external to the helmet so that the helmet is not to any significant degree loaded by the system.

More specifically an object of this invention is to provide a combined safety helmet and miniature PA system whose amplifier and loud speaker are in a unit attachable to the body of the bicyclist.

Briefly stated, these objects are attained by a safety helmet for a bicyclist combined with a miniature public address (PA) system which makes it possible for the riding bicyclist to broadcast to those who are in the hearing range of the system. The helmet which is formed from an outer shell, having a cushioning inner liner, has extending therefrom a gooseneck supporting a microphone at a position adjacent the mouth of the bicyclist wearing the helmet. The microphone is connected by a line passing through the gooseneck and extending behind the helmet to a compact amplifier and loud speaker unit clipped onto the waist belt of the bicyclist. Power for the unit is supplied by a battery power back, included in the unit or incorporated in the frame of the bicycle.

BRIEF DESCRIPTION OF DRAWING

For a better understanding of the invention, as well as further features thereof, reference is made to the detailed description thereof to be read in connection with the annexed drawings wherein.

DESCRIPTION OF INVENTION

Figure 1:
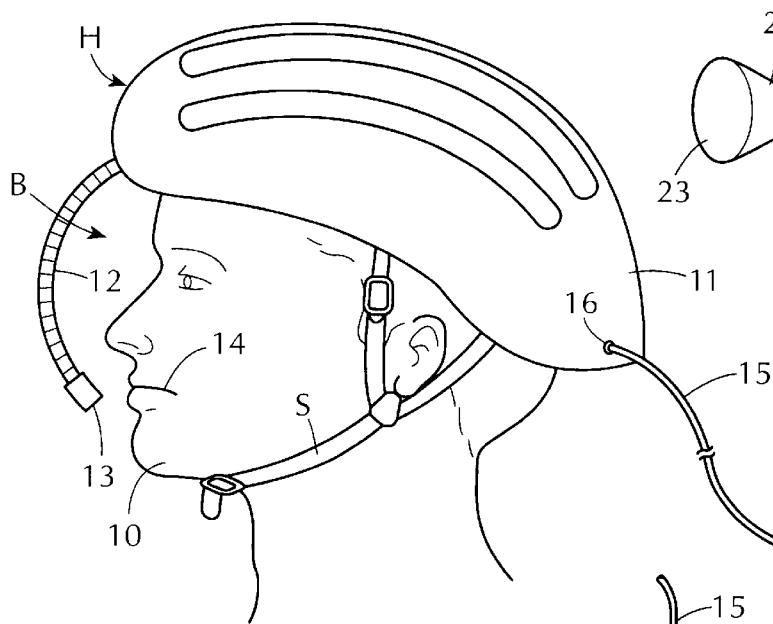
FIG. 1 illustrates in side view a safety helmet in accordance with the invention provided with aa microphone.
Figure 2:
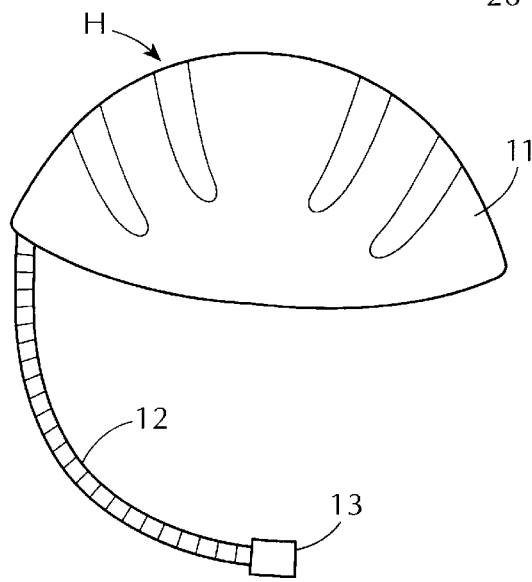
FIG. 2 is a front view of the helmet.
Figure 3:
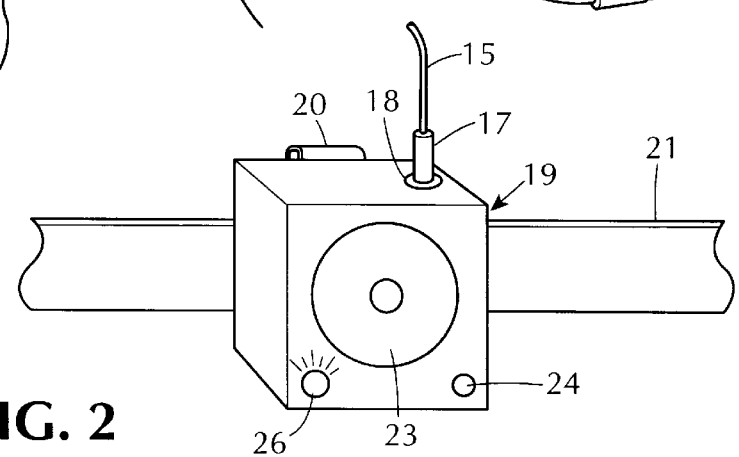
FIG. 3 shows the PA unit which is connected by a line to the microphone of the helmet and is clipped onto the waist belt of the bicyclist.
Figure 5:
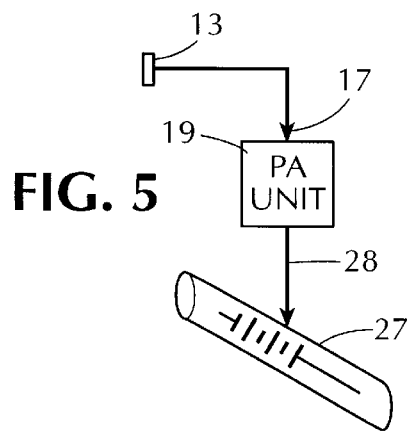
FIG. 5 shows a PA unit powered by a battery power pack incorporated in the frame of the bicycle.

Shown in FIGS. 1 and 2 is a helmet H in accordance with the invention worn on the head 10 of a bicyclist. The helmet is strapped by straps S onto the chin of the wearer so that it remains securely in place even as the head of the bicyclist is agitated in the course of travel or strikes the ground should the bicyclist fall off his bicycle.

Helmet H is formed by an outer shell 11 which is shaped to fit onto the head of the bicyclists, the shell being molded of high-strength synthetic plastic material, such as polycarbonate or polypropylene which may be reinforced by fiberglass. The interior of shell 11 is lined with a layer of cushioning material, such as flexible polyurethane foam (not shown).

Anchored on helmet H and extending therefrom is a tubular gooseneck 12 which is a bendable pipe which can be bent to assume any desired curvature. Supported at the end of gooseneck 12 is a tiny microphone 13. When the helmet is placed on the head of the bicyclist, the gooseneck is then shaped to position microphone adjacent the mouth 14 of the cyclist. Microphone 13 is connected by a line or cable 15 which runs from the microphone through gooseneck 12 and through the liner of the helmet out of an opening 16 in the rear of the helmet to extend therefrom and terminate in a plug 17.

Plug 17 is plugged into an input socket 18 in a PA unit 19 which is incased in a high-strength plastic box that is by means of a clip 20 attached to the rear wall of the box clipped onto a waist belt 21 worn by the bicyclist.

Figure 4:
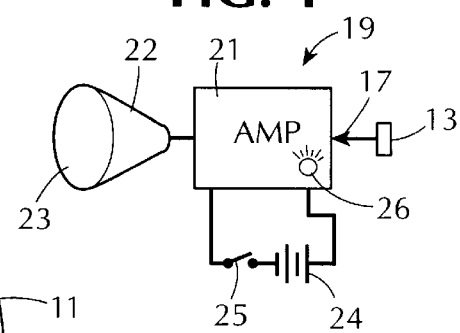
FIG. 4 is a block diagram of the PA unit shown in FIG. 3.

As shown separately in FIG. 4. Microphone 13 is connected by a line or cable 14 which runs from the microphone through gooseneck 12 and through the liner of the helmet out of an opening 15 in the rear of the helmet to extend therefrom and terminate in a plug 17.

Plug 17 is plugged into an input socket 18 in a PA unit 19 which is encased in a high-strength plastic box that is by means of a clip 20 attached to the rear wall of the box dipped onto a waist belt 21 worn by the bicyclist.

As shown separately in FIG. 4 PA unit 19 includes a solid state miniature amplifier 21 to whose input is connected the microphone 13 mounted on the safety helmet by means of plug 17. The output of amplifier 21 is connected to a loud speaker 22 attached to the mouth of a small horn 23. The amplifier is powered by a rechargeable battery pack 24 connected to the amplifier through a push-button switch 25 which is mounted on the front of the box.

Thus the bicyclist has only to press the button of switch 24 to turn on the PA system and to again press this button to turn it off. Amplifier 21 includes a volume control 26 whose dial is located in the front well of the PA unit box. Hence the bicyclist can rase or lower the volume to suit his needs.

Thus whenever the bicyclist while riding his bicycle wishes to broadcast a message of any sort, such as a warning to a pedestrian on the road he is travelling, or he wishes to communicate with a nearby bicyclist equipped with a similar helmet and PA system, all the bicyclist has to do is to switch on the PA system. This can be without removing a hand from the handlebar except for a moment.

It is not essential that the PA unit be clipped onto a waist belt, for it can be suspended from a necklace worn by the bicyclist to rest on the chest, or it can be bolted onto the handlebar. But wherever the unit is placed, its loudspeaker horn should face forward.

In the self-contained PA unit shown in FIG. 4 the unit has a battery power pack housed therein. Since the unit is small, this to limit the amount of available power and therefore the effective hearing range of the unit. In order therefore to provide a power source of greater capacity, in the arrangement shown in FIG. 4, the PA unit does not include its own battery power pack, but derives its power from a power pack of the type disclosed in the above-identified copending patent application in which the power pack is encased in one tubular branch of a bicycle frame, the batteries enclosed in the branch being connected to outlets mounted in another branch of the frame.

Unit 19 in FIG. 4 is therefrom provided with a power line 28 which plugs into an outlet in a branch 27 in the bicycle frame. The advantage of this external power source is that it has a far greater power capacity than a power pack stored in the PA unit itself.

While there has been shown and described preferred embodiments of a combined safety helmet and PA system, it will be appreciated that many changes and modifications may be made therein without, however, departing from the essential spirit thereof.

I claim:

1. A safety helmet for a bicyclist combined with a public address system making it possible for the bicyclist to broadcast as he rides his bicycle, said combination comprising:

A. a safety helmet having a microphone extending therefrom mounted on a flexible tubular support anchored on the helmet to occupy a position adjacent the mouth of the bicyclist, said microphone being connected to a line extending from the helmet through the support to an external terminal; and B. a unit adapted to be attached to the bicyclist including an amplifier having an input connected to said terminal and a loud speaker connected to an output of said amplifier whereby when the bicyclist speaks into the microphone, his speech is reproduced and broadcast by said loud speaker.

2. The combination as set forth in claim 1, in which the microphone is extended from the helmet through the support which is formed by a bendable gooseneck.

3. The combination as set forth in claim 1, in which said terminal is formed by a plug which is plugged into an input socket in said unit.

4. The combination as set forth in claim 1, in which the unit is encased in a box and in which said loud speaker is mounted in a horn.

5. The combination as set forth in claim 1, in which the unit is provided with a clip whereby the unit is clippable onto a waistbelt worn by the bicyclist.

6. The combination as set forth in claim 4, in which power for the amplifier is supplied by batteries housed in said box.

7. The combination as set forth in claim 6, further including a switch mounted on a front wall of the box connecting said batteries to said amplifier.

8. The combination as set forth in claim 1, in which power for the unit is suppliable thereto by a power pack encased in a frame of the bicycle.

* * * * *